United States Patent [19]

Iwasaki et al.

[11] Patent Number: 5,561,551
[45] Date of Patent: Oct. 1, 1996

[54] METHOD AND APPARATUS FOR DETERMINING NOISE FACTOR OF OPTICAL AMPLIFIER

[75] Inventors: Takashi Iwasaki; Haruyoshi Uchiyama, both of Tokyo; Kazuo Aida, Yokohama; Yoshiaki Sato, Chiba, all of Japan

[73] Assignees: Ando Electric Co., Ltd.; Nippon Telegraph and Telephone Corporation, both of Tokyo, Japan

[21] Appl. No.: 542,737

[22] Filed: Oct. 13, 1995

[30] Foreign Application Priority Data

Oct. 14, 1994 [JP] Japan ..................................... 6-249838

[51] Int. Cl.$^6$ ............................................ H04B 10/02
[52] U.S. Cl. ............................................ 359/337; 359/177
[58] Field of Search .................................... 359/110, 177, 359/341, 337

[56] References Cited

U.S. PATENT DOCUMENTS

| | | | |
|---|---|---|---|
| 5,282,074 | 1/1994 | Miyazaki et al. ................ | 359/177 X |
| 5,295,015 | 3/1994 | Yoneyama ....................... | 359/333 |
| 5,471,334 | 11/1995 | Masuda et al. .................. | 359/177 |

FOREIGN PATENT DOCUMENTS

| | | |
|---|---|---|
| 0594178 | 4/1994 | European Pat. Off. . |
| 0667688 | 8/1995 | European Pat. Off. . |
| 7-226549 | 8/1995 | Japan . |

*Primary Examiner*—Mark Hellner
*Attorney, Agent, or Firm*—Finnegan, Henderson, Farabow, Garrett & Dunner, L.L.P.

[57] ABSTRACT

A simple, quick and precise method for determining a noise factor of an optical amplifier system is presented and demonstrated with an apparatus based on rare-earth doped optical fibers. The method is based on rapid adjustments of the phase differentials between the input optical signals into and the output optical signals from the optical amplifier to compensate for system variables including the optical fiber lengths within the apparatus as well as in the ancillary devices. A cw laser source is modulated with a first pulse having a significantly shorter cycle than a lifetime of excited atoms within the doped fiber, and the modulated pulses are continually applied to the noise determining apparatus. The optical output signal from the apparatus is synchronized with the first pulse and the optical output signal is further modulated with a series of second pulses having increasing phase differentials in relation to the first pulse. The electrical output power from the noise determining apparatus undergoes a maximum and a minimum values, and the noise factor of the apparatus is calculated by using the values of the respective maximum and the minimum electrical output power.

4 Claims, 5 Drawing Sheets

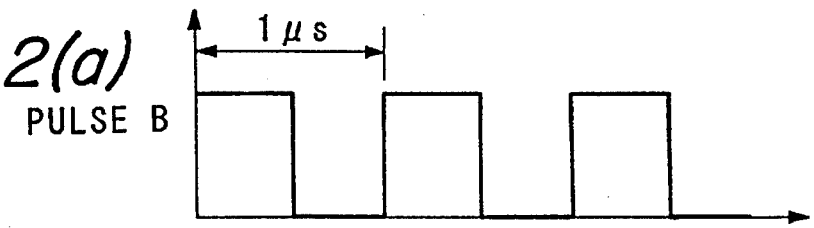
FIG. 2(a) PULSE B
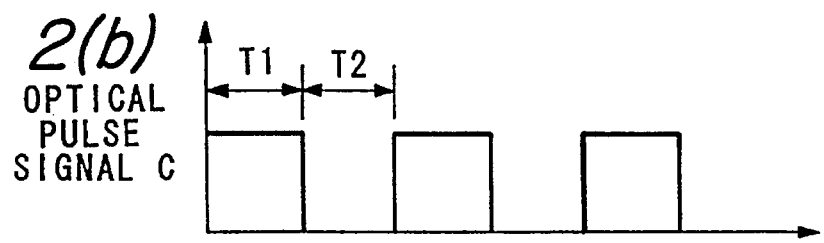
FIG. 2(b) OPTICAL PULSE SIGNAL C
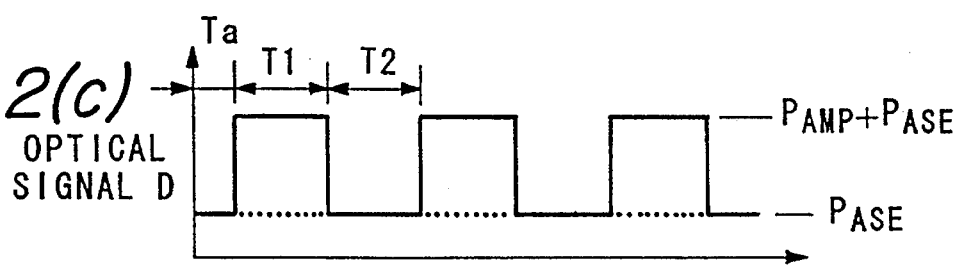
FIG. 2(c) OPTICAL SIGNAL D
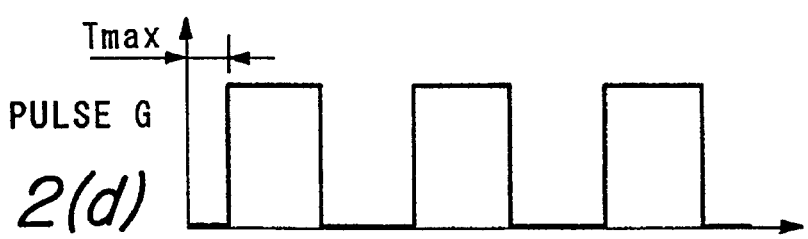
FIG. 2(d) PULSE G
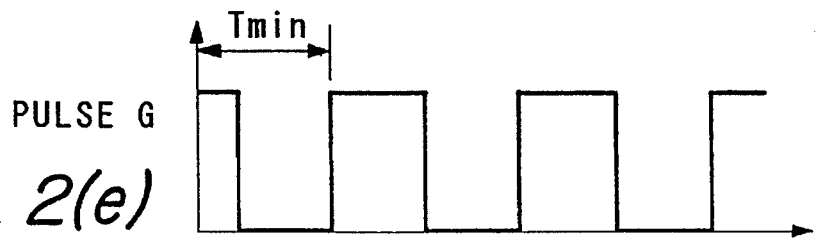
FIG. 2(e) PULSE G

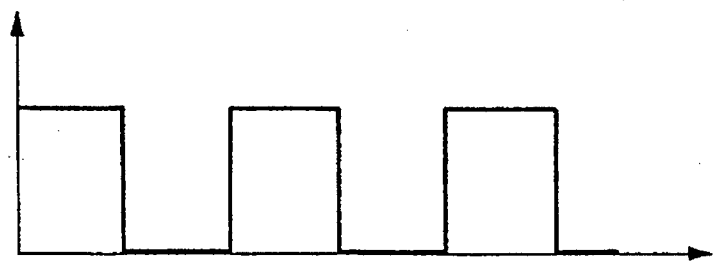
FIG. 3(a) PULSE B
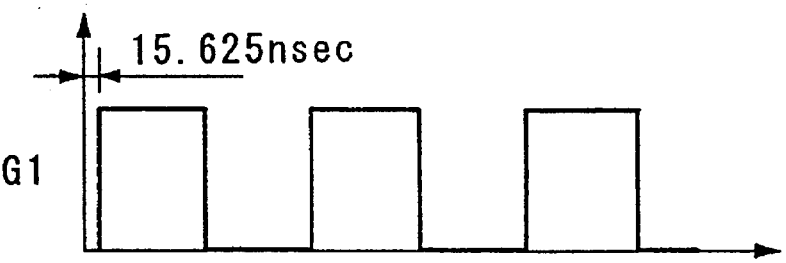
FIG. 3(b) PULSE G1
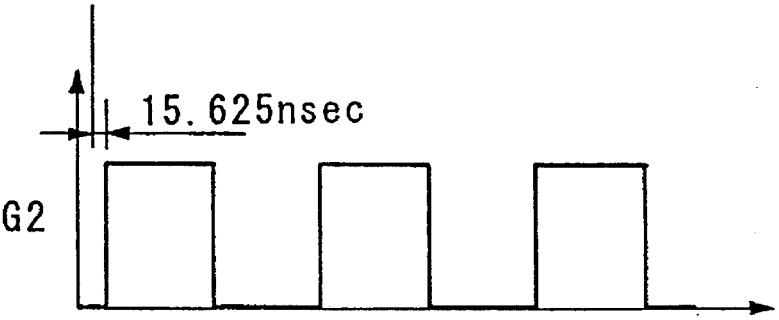
FIG. 3(c) PULSE G2
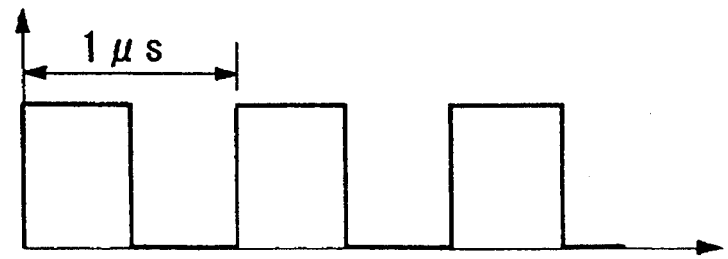
FIG. 3(d) PULSE G64

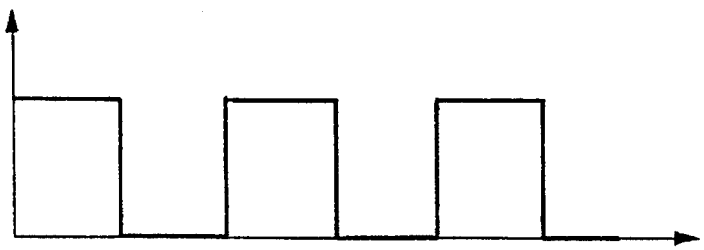
FIG. 5(a) PULSE B
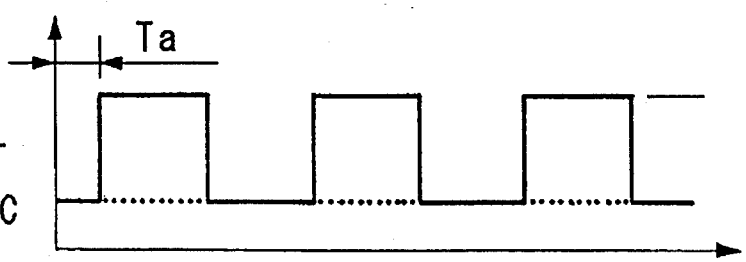
FIG. 5(b) OPTICAL PULSE SIGNAL C
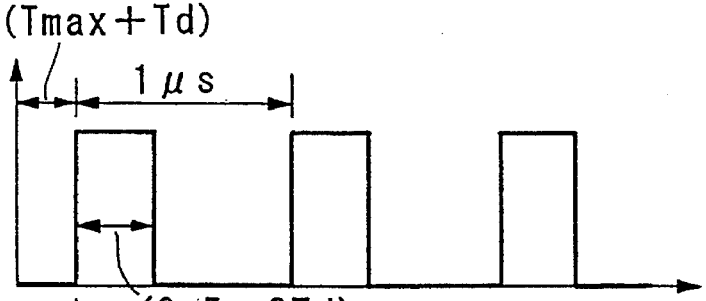
FIG. 5(c) PULSE S1
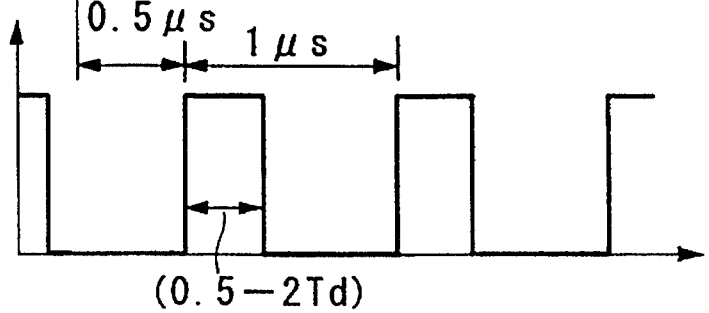
FIG. 5(d) PULSE S2

METHOD AND APPARATUS FOR DETERMINING NOISE FACTOR OF OPTICAL AMPLIFIER

BACKGROUND OF THE INVENTION

1. Field of the Invention

The present invention relates in general to measuring of a noise factor and relates in particular to a noise factor measuring method and apparatus which permits simple, rapid and precise adjustment of phase differential.

2. Description of the Related Art

Presently, there are two known types of optical amplifiers: those based on optical fiber doped with a rare-earth element, such as erbium (Er); and those based on a semiconductor optical amplifier. A parameter for characterizing the performance of these optical amplifiers is a noise factor, and a method and an apparatus for determining the noise factor (NF) have been developed and disclosed in a Japanese Patent Application Number H6-17593.

In the case of the optical amplifier based on Er-doped optical fiber (shortened to optical fiber hereinbelow), when an excitation laser light is injected into the optical fiber, some atoms within the optical fiber are excited from a base level to a higher energy level. When the atoms return from the higher energy level the base level, light is emitted in the process. There are two modes of light emission: one is an induced emission process which occurs as a result of the atomic transition action induced by the excitation laser light; and another is a spontaneous emission process (referred to as SE process). Optical amplification is achieved through the induced emission process. The transition step (from high to low energy levels) in the induced emission process occurs rapidly, however, the transition step in the spontaneous emission occurs slowly relative to the speed of the induced emission process. In Er-doped optical fibers, the lifetime of spontaneous emission (i.e. lifetime of excited atoms) ranges from several milliseconds to several tens of milliseconds. The spontaneous light (referred to as SE light hereinbelow) generated in the spontaneous emission process is amplified within the Er-doped optical fiber, and is outputted as amplified spontaneous light (referred to as ASE light hereinbelow).

The noise factor (NF) of an optical amplifier is determined as follows. A subject optical amplifier whose NF is to be determined is irradiated with a pulsed laser light having sufficiently shorter pulsing cycle than the lifetime of spontaneous emission, and the resulting values of the electrical output power with and without the laser excitation are measured. That is, on the one hand, the emitted power PASE outputted during the time interval of spontaneous emission (without the laser excitation) is measured, and on the other hand, a sum of the laser output power PAMP and the emitted power PASE (i.e. PAMP+PASE) during the time interval of laser excitation is measured. Then, the noise factor is given by the following equation:

$$NF = (PASE/h.v.A.BO) + 1/A \quad (1)$$

where h is the Planck constant; v is the optical frequency of the laser light inputted into the subject optical amplifier; A is the gain of the subject optical amplifier; and BO is the transmission band width of the device for measuring the emitted power PASE of the ASE light.

The gain A of the optical amplifier can be approximated by the following equation:

$$A \approx (PAMP - PASE)/PIN \quad (2)$$

where PIN is a value of the input power of the laser light into the subject optical amplifier.

One problem in the method of NF determination presented above is that the pulsed laser light inputted into the subject optical amplifier must first propagate through the optical amplifier before it is outputted from the optical fiber, and therefore the laser output is delayed, where the delay time is dependent on the length of the optical fiber. It follows that subject optical amplifiers having differing lengths have different delay times. Additional delay is caused by optical fibers connecting the subject optical amplifier and an NF determining system. Therefore, in this approach to determining the NF of an optical amplifier demands that the various delay times be pre-determined, and that the phase relationship of the switched laser pulses be determined between the pulse phases measured during both time intervals with and without the pulsed laser excitation.

SUMMARY OF THE INVENTION

It is an object of the present invention to provide a rapid and precise method for dealing with the delays in output pulses in an optical amplifier system and its associated optical fibers, and to present an apparatus for determining the noise factor of an optical amplifier system based on rare-earth doped optical fibers for input/output of optical signals.

The object is achieved in a method of determining a noise factor in an optical amplifier system including a rare-earth element doped optical fiber and a cw laser source for providing atomic excitation causing atoms within said rare-earth element doped optical fiber to be excited to a higher energy level, comprising the steps of: modulating said cw laser source with a first pulse having a significantly shorter cycle than a lifetime of said atoms to generate an optical pulse signal for inputting into an optical amplifier whose noise factor is to be determined; synchronizing an optical output signal from said optical amplifier with said first pulse and generating a second pulse having an increased phase differential in relation to said first pulse; obtaining a maximum electrical output power and a minimum electrical output power from a series of optical output signals outputted by said optical amplifier through successively modulating said optical output signals with a successive second pulse; and determining said noise factor based on said maximum electrical output power and said minimum electrical output power.

It is also an object of the present invention to present an apparatus, suitable for the above method, comprising: pulse generation means for generating a first pulse having a significantly shorter cycle than a lifetime of said atoms and a second pulse having an increased phase differential in relation to said first pulse; optical pulse generation means for generating an optical pulse signal continually by modulating said cw laser source with said first pulse and outputting said optical pulse signal to an optical amplifier; modulating means for modulating an optical output signal from said optical amplifier with said second pulse; electrical power measuring means for measuring a value of electrical output power produced by said modulating means; and control means for storing successively measured values of said electrical output power, controlling output of said second pulse generated by said optical pulse generation means and determining said noise factor based on a maximum value of said electrical output power and a minimum value of said electrical output power.

According to the method and apparatus presented above, the pulse generation device is provided to produce first pulses whose cycle is significantly shorter than the lifetime of excited atoms generated in the doped fiber. The pulse generation device also produces second pulses whose phase differentials successively increase up to a given phase differential which is significantly below the lifetime of the excited atoms.

The optical pulse generation device is provided to produce optical pulses by modulating the cw laser with the first pulses, and applies the optical pulses to the NF determining apparatus.

The modulating device is provided to modulate the optical output signals from the apparatus with the second pulses to produce further differentials in accordance with the requirements of the apparatus system and its ancillary devices.

The electrical power measuring device is provided to measure the electrical power of the signal outputted by the modulating device, and inputs the measured results into the control device.

The control device is provided to memorize the successive values of the measured electrical power, and to control the output values of the second pulses generated by the optical pulse generation device as well as to compute the noise factor of the apparatus using a maximum and a minimum values of the measured electrical power.

The object is achieved also in a variation of the method comprising the steps of: generating an optical pulse signal by modulating said cw laser source with a first pulse having a significantly shorter cycle than a lifetime of said atoms to generate an optical pulse signal for inputting into an optical amplifier whose noise factor is to be determined; synchronizing an optical output signal from said optical amplifier with said first pulse to generate a second pulse having an increased phase differential in relation to said first pulse; obtaining a maximum electrical output power and a minimum electrical output power from a series of said optical output signals outputted by said optical amplifier by successively modulating said optical output signals with a successive second pulse; selecting from second pulses a third pulse giving a small duty ratio to said maximum electrical output power to define a first electrical output power; selecting from second pulses a fourth pulse giving a small duty ratio to said minimum electrical output power to define a second electrical output power; and determining said noise factor based on said first electrical output power and said second electrical output power.

This basic method and apparatus permits quick and accurate determination of the noise factor allowing for the delaying, effects caused by internal and external doped optical fibers associated with the noise determining apparatus.

The object is achieved in a variation of the apparatus comprising: pulse generation means for generating a first pulse having a significantly shorter cycle than a lifetime of said atoms and a second pulse having an increased phase differential in relation to said first pulse; optical pulse generation means for generating an optical pulse signal continually by modulating said cw laser source with said first pulse and outputting said optical pulse signal to an optical amplifier; modulating means for modulating an optical output signal from said optical amplifier with said second pulse or with a pulse to produce a smaller duty ratio in relation to said second pulse; electrical power measuring means for measuring a value of electrical output power produced by said modulating means; and control means for storing successively measured values of said electrical output power, selecting a third pulse from second pulses giving a small duty ratio to said maximum electrical output power to define a first electrical output power; selecting a fourth pulse from second pulses giving a small duty ratio to said minimum electrical output power to define a second electrical output power; and determining said noise factor based on said first electrical output power and said second electrical output power.

According to the variation of the method and apparatus presented above, the pulse generation device is provided to produce first pulses whose cycle is significantly shorter than the lifetime of excited atoms generated in the doped fiber. The pulse generation device also produces second pulses whose phase differentials successively increase up to a given differential which is significantly below the lifetime of the excited atoms, or pulses whose duty ratio is smaller in relation to the second pulses. Therefore, there is no problem of distortion caused by modulation of the laser light with these input pulses.

The optical pulse generation device is provided to produce optical pulses by modulating the cw laser with the first pulses, and applies the optical pulses to the NF determining apparatus.

The modulating device is provided to modulate the optical output signals from the apparatus with the second pulses or pulses whose duty ratio is smaller in relation to second pulses to produce optical signals having phase differentials in accordance with the requirements of the apparatus system and its ancillary devices.

The electrical power measuring device is provided to measure the electrical power of the signal outputted by the modulating device, and inputs the measured results into the control device.

The control device is provided to memorize the successive values of the measured electrical power, to select from the second pulses a third pulse whose duty ratio is small in relation to a maximum measured electrical power and to supply the pulse to the pulse generation device, to select from the second pulses a fourth pulse whose duty ratio is small in relation to a minimum measured electrical power and to supply the pulse to the pulse generation device, and to compute the noise factor of the apparatus using a first electrical power produced by the third pulse acting on the modulating device and a second electrical power produced by the fourth pulse acting on the modulating device. This approach permits more accurate determination of the noise factor allowing for the effects of measuring errors.

BRIEF DESCRIPTION OF THE DRAWINGS

FIG. 2(a) through 2(e) are a first example of the timing of pulse waveforms in various sections of the apparatus.

FIG. 3(a) through 3(d) are a second example of the timing of pulse waveforms in various sections of the apparatus.

FIG. 5(a) through 5(d) are an example of the effect of change in the duty ratio of pulse G on the timing of pulses in various section of the apparatus.

DESCRIPTION OF THE PREFERRED EMBODIMENTS

A preferred embodiment of the present invention of a NF determining method and an apparatus for use therewith will be explained with reference to FIGS. 1 to 5.

Figure 1:
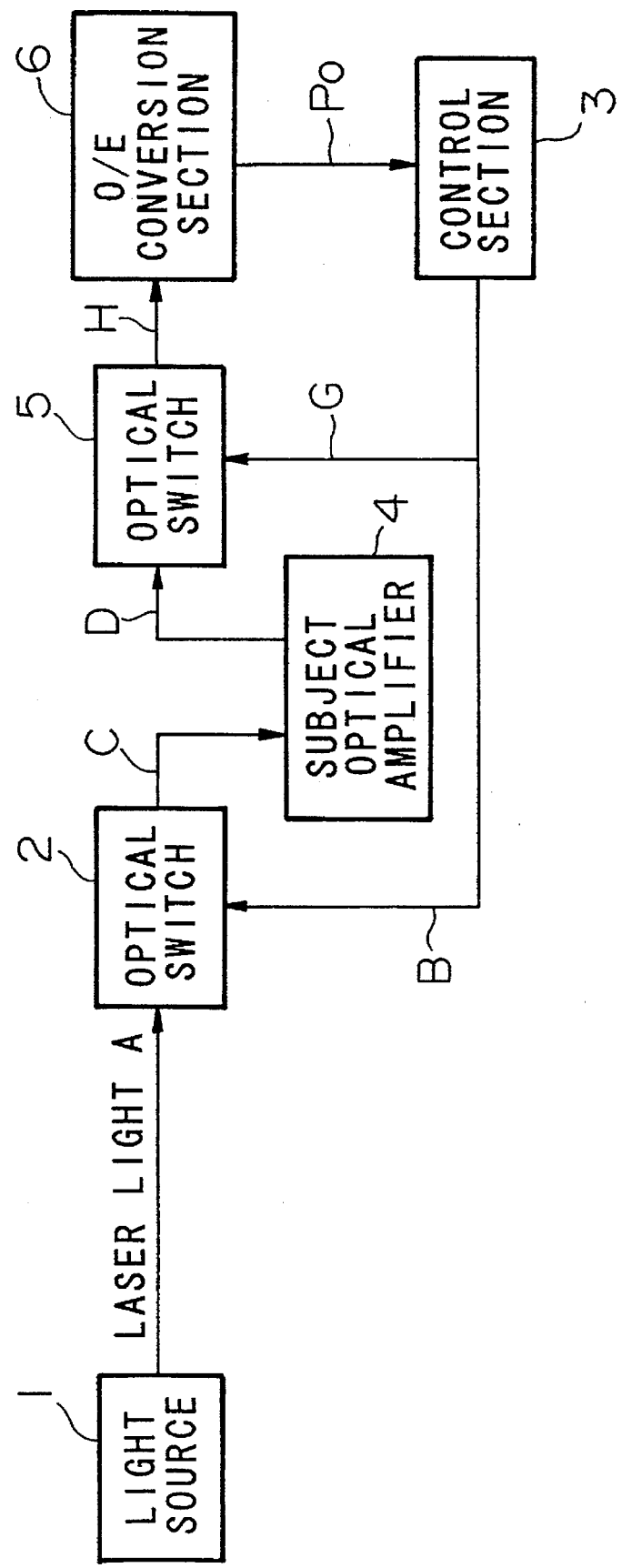
FIG. 1 is a schematic block diagram of an apparatus of the present invention for determining a noise factor of an optical amplifier.
Figure 4:
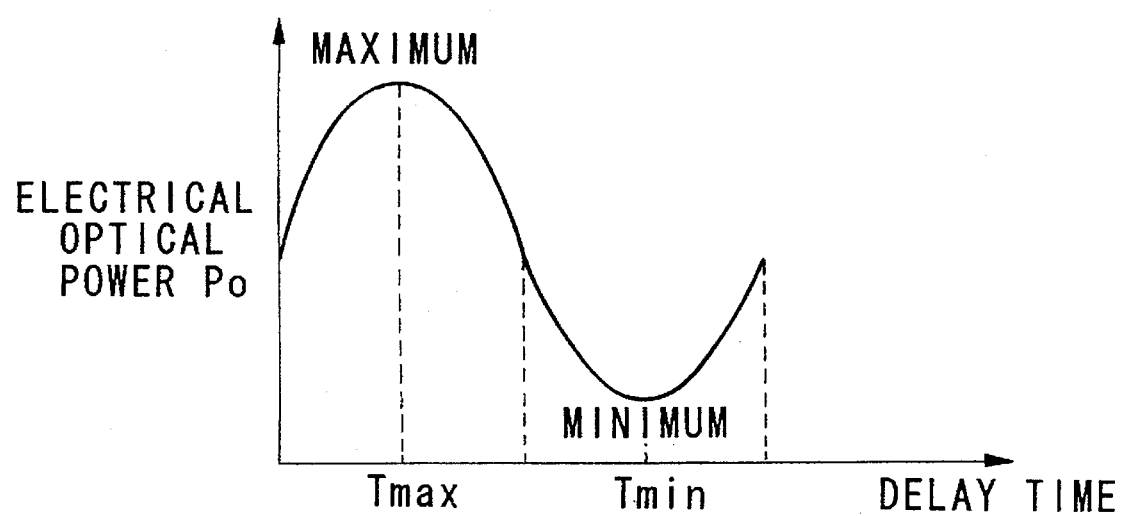
FIG. 4 is a graph showing a relationship between the electrical power output and the successive delay times in the NF determining apparatus of the present invention.

FIG. 1 is a schematic block diagram to show the main components of the NF determining apparatus, and FIGS. 2 and 3 show various pulse waveforms in the respective sections of the apparatus. Referring to FIG. 1, a laser light A from a continuous working (cw) laser source 1 having a 1.55 μm band is injected into an optical switch 2. The optical switch 2 converts the laser light A to optical pulse signal C having a 1 μs cycle and a duty ratio 50%, in accordance with a pulse B supplied by a controller section 3, and inputs the optical signal C into a subject optical amplifier 4. The subject optical amplifier 4 includes an Er+3-doped optical fiber at 1.48 μm excitation and amplifies the optical signal C and outputs an optical signal D.

As shown in FIG. 2(a) the cycle of pulse B is chosen to be at 1 μs significantly shorter than the spontaneous emission lifetime of the Er+3-doped optical fiber (at several ms to several tens of ms). As can be seen in FIG. 2(b), optical pulse signal C has a time interval T1 during which the laser excitation is provided and a time interval T2 during which no laser excitation is provided. As shown in FIG. 2(c), optical signal D is outputted with a time delay Ta which is dependent on the length of the Er+3-doped optical fiber and other factors causing delay in the subject optical a amplifier 4. During the time interval T1, optical signal D consists of amplified laser Light and the ASE light while during the time interval T2, optical signal D consists only of the ASE light. In other words, the electrical output power during the time interval T1 is comprised of a sum (PAMP+PASE) of the electrical output power PAMP generated by the amplified laser light and the electrical output power PASE from the ASE light while the electrical power during the time interval T2 is comprised only of PASE generated by the ASE light. An optical switch 5 modulates the optical signal D in accordance with a pulse G outputted by the control section 3 and outputs an optical signal H. An optical/electrical (O/E) conversion section 6 selects an electrical output power PO from the input optical signal H and inputs PO into the control section 3.

The operation of the NF determining apparatus will now be explained.

When the start-measure switch is pressed, the control section turns on the cw laser source 1, and by means of a pulse generation device and an optical pulse generation device, generates an optical pulse B, shown in FIG. 2(a), to the optical switch 2. From this point on, pulse B is continually outputted to the optical switch 2 which continually outputs an optical pulse signal C (refer to FIG. 2) into the subject optical amplifier 4. The result is that the optical signal D is continually outputted from the subject optical amplifier 4. The control section 3 then outputs a pulse signal G1, which is generated by delaying pulse B by 15.625 ns, to the optical switch 5. This effect is illustrated in FIG. 3. At this point, the controller section 3 commands its internal memory to store the output signal from the O/E conversion section 6. The control section 3 then outputs a pulse signal G2 (refer to FIG. 3(c), which is generated by delaying the pulse signal G1 by 15.625 ns, to the optical switch 5, and again commands its internal memory to store the output signal from the O/E conversion section 6. This sequence of events (of delaying all the succeeding signals by 15.625 ns and outputting the delayed signal to the optical switch 5) is continued until a pulse signal G64 is generated. Likewise, the output signals from the O/E conversion section 6 are successively stored in the internal memory of the control section 3.

The cumulative delay time over the 64 delay events is 1 μs (15.625 ns×64), in other words, the optical switch 5 successively produces a series of 64 pulse signals G each having a minimum delay time of 1/64 of a cycle to complete a maximum cycle delay time of 1 μs. Each of the pulse signals G inputted into the optical switch 5 produces corresponding electrical output power. The values of the output power PO from the optical switch 5 are measured for each delay time, producing the 64 successive measurements shown in FIG. 4. By designating Tmax to be the delay time (measured in reference to pulse B) of a pulse signal G to produce the maximum electrical output power and Tmin robe the delay time of a pulse signal G to produce the minimum electrical output power, it can be seen by comparing the waveforms of FIGS. 2(d) and 2(e) that:

Tmax≈Ta, and that Tmin≈Ta+T1.

The process outlined above enables to provide the delay time Ta for the optical signal D as Tmax.

Next, the control section 3 generates a pulse signal S1, shown by a FIG. 5(c), having a cycle time of 1 μs, a pulse width of (0.5–2 Td) μs and whose rise is delayed than that of the pulse B by (Tmax+Td) μs, where Td represents a rise delay time. The pulse signal S1 is then outputted to the optical switch 5, and the value of the output electrical power (designated by P1) from the O/E conversion section 6 is memorized in the internal memory. The magnitude of the rise delay time Td is significantly shorter than the cycle time of 1 μs of the pulse signal S1, and is chosen in relation to measurement error. The control section 3 next outputs a pulse signal S2 (refer to FIG. 5(d), which is a pulse signal S1 delayed by 0.5 μs, and outputs a pulse signal S2 to the optical switch 5. The value of the output electrical power (designated by P2) from the O/E conversion section 6 is stored in the internal memory. The output values P1 and P2 are substituted in equation (2) in PAMP and PASE, respectively, and the noise factor (NF) is calculated from equations (1) and (2).

It should be noted that although it is possible to calculate NF using the maximum and the minimum values shown in FIG. 5, such a process give to a possibility that the computation results may include measurement errors.

Although the NF determining method and apparatus was explained with reference to the specific examples embodied above, it is clear that other modifications of the apparatus is possible that other circuit configurations can be made within the principle of phase adjustments of input and output pulses by using a synchronizing pulse and a compensating feedback pulse from a control section to an optical amplifier so that the NF determination can be carried out without the problems of phase delay caused by propagation delay in the optical fibers.

What is claimed is:

1. A method for determining a noise factor of an optical amplifier system including a rare-earth element doped optical fiber and a cw laser source for providing atomic excitation causing atoms within said rare-earth element doped optical fiber to be excited to a higher energy level, comprising the steps of: modulating said cw laser source with a first pulse having a significantly shorter cycle than a lifetime of said atoms to generate an optical pulse signal for inputting into said optical amplifier whose noise factor is to be determined; synchronizing an optical output signal from said optical amplifier with said first pulse and generating a second pulse having an increased phase differential in relation to said first pulse; obtaining a maximum electrical output power and a minimum electrical output power from a series of optical output signals outputted by said optical amplifier through successively modulating said optical output signals with a successive second pulse; and determining said noise factor based on said maximum electrical output power and said minimum electrical output power.

2. A method for determining a noise factor of an optical amplifier system including a rare-earth element doped optical fiber and a cw laser source for providing atomic excitation causing atoms within said rare-earth element doped optical fiber to be excited to a higher energy level, comprising the steps of: modulating said cw laser source with a first pulse having a significantly shorter cycle than a lifetime of said atoms to generate an optical pulse signal for inputting into an optical amplifier whose noise factor is to be determined; synchronizing an optical output signal from said optical amplifier with said first pulse and generating a second pulse having an increased phase differential in relation to said first pulse; obtaining a maximum electrical output power and a minimum electrical output power from a series of said optical output signals outputted by said optical amplifier by successively modulating said optical output signals with a successive second pulse; selecting from second pulses a third pulse giving a small duty ratio to said maximum electrical output power to define a first electrical output power; selecting from second pulses a fourth pulse giving a small duty ratio to said minimum electrical output power to define a second electrical output power; and determining said noise factor based on said first electrical output power and said second electrical output power.

3. An apparatus for determining a noise factor for an optical amplifier system including a rare-earth element doped optical fiber and a cw laser light source for providing atomic excitation causing atoms within said rare-earth element doped optical fiber to be excited to a higher energy level, comprising:

pulse generation means for generating a first pulse having a significantly shorter cycle than a lifetime of said atoms and a second pulse having an increased phase differential in relation to said first pulse;

optical pulse generation means for generating an optical pulse signal continually by modulating said cw laser source with said first pulse and outputting said optical pulse signal to an optical amplifier;

modulating means for modulating an optical output signal from said optical amplifier with said second pulse;

electrical power measuring means for measuring a value of electrical output power produced by said modulating means; and control means for storing successively measured values of said electrical output power, controlling output of said second pulse generated by said pulse generation means and determining said noise factor based on a maximum value of said electrical output power and a minimum value of said electrical output power.

4. An apparatus for determining a noise factor for an optical amplifier system including a rare-earth element doped optical fiber and a cw laser light source for providing atomic excitation causing atoms within said rare-earth element doped optical fiber to be excited to a higher energy level, comprising:

pulse generation means for generating a first pulse having a significantly shorter cycle than a lifetime of said atoms and generating a second pulse having an increased phase differential in relation to said first pulse;

optical pulse generation means for generating an optical pulse signal continually by modulating said cw laser source with said first pulse and outputting said optical pulse signal to an optical amplifier;

modulating means for modulating an optical output signal from said optical amplifier with said second pulse or with a pulse to produce a smaller duty ratio in relation to said second pulse;

electrical power measuring means for measuring a value of electrical output power produced by said modulating means; and control means for storing successively measured values of said electrical output power, selecting a third pulse from second pulses giving a small duty ratio to said maximum electrical output power to define a first electrical output power; selecting a fourth pulse from second pulses giving a small duty ratio to said minimum electrical output power to define a second electrical output power; and determining said noise factor based on said first electrical output power and said second electrical output power.

* * * * *